April 8, 1958 — P. MORALES — 2,829,916
SLING TRIP DEVICE
Filed June 29, 1955
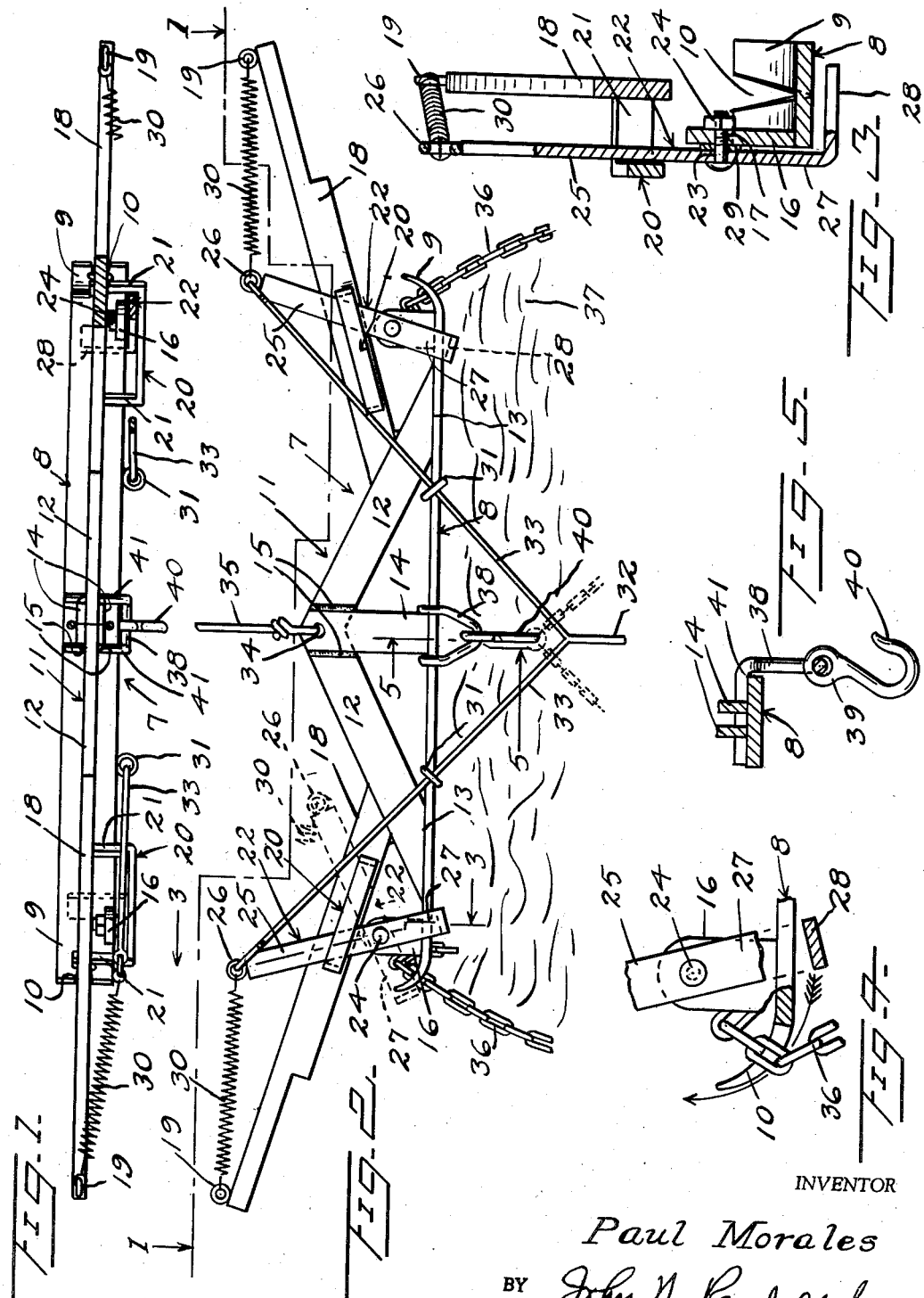
INVENTOR
Paul Morales
BY John N. Randolph
ATTORNEY

United States Patent Office 2,829,916
Patented Apr. 8, 1958

2,829,916

SLING TRIP DEVICE

Paul Morales, Franklin, La.

Application June 29, 1955, Serial No. 518,911

5 Claims. (Cl. 294—75)

This invention relates to a device adapted to be supported by a derrick or hoist and which in turn is adapted to support a sling embracing a bundle of sugar cane stalks, hay or other material to be raised, conveyed and dumped or released from an elevated position.

More particularly, it is an aim of the present invention to provide a trip device adapted to be engaged by a flexible bundle sling for supporting the sling and a bundle carried thereby and from which device the sling can be readily released from a point remote therefrom to allow the bundle and sling to drop from the supporting and tripping mechanism.

Various other objects and advantages of the invention will hereinafter become more fully apparent from the following description of the drawing, illustrating a presently preferred embodiment thereof, and wherein:

Figure 1 is a top plan view, partly in section, of the supporting and tripping device, taken substantially along a plane as indicated by the line 1—1 of Figure 2;

Figure 2 is a front elevational view thereof;

Figure 3 is an enlarged cross sectional view, taken substantially along a plane as indicated by the line 3—3 of Figure 2;

Figure 4 is a fragmentary enlarged front elevational view, partly in section, of a portion of the device, and Figure 5 is a fragmentary cross sectional view on an enlarged scale, taken substantially along a plane as indicated by the line 5—5 of Figure 2.

Referring more specifically to the drawing, a sling supporting and tripping device in its entirety and comprising the invention is designated generally 7 and includes an elongated relatively wide bar 8 having upwardly curved end portions 9 which are provided with inwardly tapered substantially V-shaped notches 10 which open outwardly of the upper edges of said end portions 9, as best seen in Figure 3.

A frame member 11 is disposed above and longitudinally of the bar 8 and comprises downwardly diverging end portions 12 the lower outer ends 13 of which are beveled to engage flush on the upper surface of the bar 8 and to which said ends 13 are suitably secured. Said frame portions 12 merge integrally or are suitably joined at their upper ends. A pair of upright brace members 14 have lower ends suitably secured to the intermediate portion of the bar 8 in spaced apart substantially parallel relation to one another. Said brace members extend upwardly from the intermediate portion of the bar 8 and have upper ends straddling the upper intermediate portion of the frame 11, as defined by the adjacent parts of the frame portions 12, and said upper ends of the brace members 14 are secured in any suitable manner as by welding, as seen at 15 in Figure 2, to said upper intermediate portion of the frame 11.

The end portions 13 of the frame 11 are secured to the bar 8 at points spaced from the upturned ends 9 of said bar. A short post or standard 16 is fixed to and rises from the bar 8 between each frame end 13 and the adjacent upturned bar end 9. The posts or standards 16 are located adjacent one longitudinal edge of the bar 8, as best illustrated in Figure 3. Each standard 16, adjacent its upper end, is provided with a fastening receiving opening 17 which is disposed in substantially a centered position relative to the adjacent upwardly curved arcuate bar end 9, as best illustrated in Figure 4.

A pair of stationary arms 18 have inner ends secured in any suitable manner to the frame portions 12. The arms 18 extend upwardly and outwardly from said frame portions 12. Each arm 18 has a fixed eye 19 secured to and rising from the outer free end thereof. Each arm 18 is also provided adjacent its inner end with a strip 20 forming a guide and which has inturned ends 21, as seen in Figure 1, which are secured to corresponding sides of the arms 18 for supporting the intermediate portions of the strips 20 outwardly with respect to portions of the longitudinal edge of the bar 8, adjacent to which the standards 16 are disposed, as seen in Figure 1.

A pair of trip levers 22 are swingably supported by the standards 16. Said levers 22 have openings 23 spaced from the ends thereof through which the shanks of bolt and nut fastenings loosely extend. The shanks of said bolt and nut fastenings 24 extend inwardly through the standards 16 to provide pivots about which the levers 22 are swingable longitudinally of the device 7. Upper portions 25 of the levers 22 extend upwardly through and are swingably disposed in the guide members 20 between the end portions 21 thereof. Each of said upper lever portions 25 terminates in an eye 26. The lower portions 27 of the levers 22 extend downwardly on the outer sides of the standards 16 and to below the longitudinal edge of the bar 8, adjacent to which said standards are disposed. Said lower lever portions 27 have inturned terminal portions 28 which are disposed beneath and spaced from the bar 8. Each lever 22 is preferably provided with a boss 29 on its inner side which surrounds its pivot 24, for spacing the lever 22 outwardly from the standard 16 thereof and the adjacent edge of the bar 8, as seen in Figure 3.

Pull springs 30 connect the eyes 19 of the arms 18 to the adjacent eyes 26 of the trip levers 22 for urging the upper ends 25 of the levers to swing outwardly against the outermost strip portions 21 for causing the lower lever portions 27 and 28 to be swung inwardly toward one another and away from the upturned bar ends 9, as illustrated in Figures 1, 2 and 4. Longitudinally spaced guide eyes 31 are fixed to and project outwardly from the aforementioned longitudinal edge of the bar 8 and are disposed between the lever portions 27 and spaced thereon. A flexible actuating member 32 has an upper end defined by two flexible branch portions 33 which extend upwardly in diverging relation to one another from below the level of the bar 8 through the guide eyes 31 and which have terminal portions constituting the upper free ends thereof which are secured to the lever eyes 26. Said flexible member 32 may be of any length to extend downwardly any distance from the branch portions 33. The upper portions of the brace members 14 and frame 11 are provided with aligned openings 34 through which a suitable hoist member may extend and by which said hoist member may be secured to the device 7. The hoist member 35 may assume any form but is herein shown as a rope or cable.

A sling 36 in the form of a chain which engages under a bundle 37 of stalks or the like has links thereof which are spaced from its two end links engaged in the inwardly tapered V-shaped notches 10, as best illustrated in Figure 4. With the sling 36 thus attached to the supporting and tripping device 7, it will be readily apparent that said device may be elevated and conveyed by the hoist means 35 to a location from which the bundle is to be discharged. When the device 7 is disposed over the point where the bundle is to be discharged which may be at any elevation, the operator standing at a point remote to the position of the device 7 by grasping and exerting a downward pull on the flexible trip actuator 32 will cause the branch portions 33 thereof to be drawn downwardly and inwardly through the guides 31 to thus exert a pull on the lever eyes 26 to cause the upper ends of the levers 22 to be swung toward one another about their pivots 24 and until edge portions of the upper parts 25 of the levers strike the lower adjacently disposed inturned ends 21 of the guide members 20. As the upper portions 25 of the levers are thus swung toward one another, the lower portions 27, 28 swing outwardly and away from one another and around the upturned bar ends 9, as illustrated in dotted lines in Figure 2. During this outward and upward swinging movement of the lower lever portions, the parts 28 which underlie the bar 8 strike the end portions of the chain or sling 36 immediately below the links thereof which are engaged in the notches 10 to thus force the links which are engaged and wedged in the notches 10 upwardly and outwardly with respect to said notches and into the wide open outer ends of the notches. Thus, the chain ends are released and permitted to slide outwardly through the open outer ends of the notches 10 or may be displaced completely out of engagement with the notches 10. The chain ends when thus released from the notches 10 slide over the lever portions 28 so that the sling 36 and the bundle 37 engaged thereby may then drop by gravity from the supporting and tripping mechanism 7. When the pull on the trip actuating member 32 is released, the tensioned springs 30 will swing the levers 22 back to their positions as illustrated in Figures 1 and 2 with said levers inclined downwardly and inwardly with respect to one another, and so that the supporting and tripping device 7 is immediately ready for re-use, as previously described.

A loop or bail 38 extends downwardly from the aforementioned longitudinal edge of the bar 8 and intermediate of the ends thereof and is loosely engaged by the eye 39 of the shank end of a hook 40 for swingably suspending the hook below the bar 8. The bail or loop 38 is preferably formed from a rod having end portions 41 which are disposed at substantially right angles to the intermediate loop or bail portion 38 and which extend transversely across the upper side of the bar 8 and are suitably secured thereto. Said end portions 41 preferably straddle the upright braces 14.

The hook 40 may be utilized in lieu of the two notched ends 9 for engaging both ends of the chain or sling 36 where it is not desired to release the chain or the bundle 37 supported thereby. Additionally, where desired two bundles may be simultaneously supported and conveyed by the device 7 by attaching adjacent ends of two chain slings 36 to the hook 40 and engaging remote ends of the two chain slings with the end notches 10. Operation of the levers 22, as previously described, by a downward pull on the member 32, will then release the remote ends of the sling chains from the notches 10 so that the bundles supported by the slings will be released to drop by gravity while the slings are supported each at one end only by the hook 40. In this way, the supporting and tripping device 7 is adapted for supporting either large or small bundles 37.

Various modifications and changes are contemplated and may obviously be resorted to, without departing from the spirit or scope of the invention as hereinafter defined by the appended claims.

I claim as my invention:

1. A supporting and tripping mechanism of the character described comprising an elongated bottom bar having upwardly curved ends provided with outwardly opening inwardly tapered notches, a supporting frame disposed above said bar and longitudinally thereof and having end portions secured to the bar, said frame having an upper apex portion located above the intermediate portion of said bar and adapted to be connected to a hoist means, arms fixed to and extending outwardly and upwardly from the supporting frame adjacent the ends thereof, standards fixed to and rising from said bar between the end portions of said frame and the upturned ends of the bar, trip levers pivotally supported on said standards for swinging movement longitudinally of the bar including upper portions extending upwardly from the standards and lower portions extending downwardly to below said bar, said lower lever portions having inturned terminals underlying portions of the bar and disposed relative to said trip lever pivots to swing in arcs around the outer sides of the upwardly curved bar ends and in adjacency thereto, spring means connected to upper ends of said trip levers and to outer ends of said arms for urging said inturned bottom lever portions toward one another and away from the upturned bar ends, the notches of said upturned bar ends being adapted to engage links located adjacent the ends of a bundle supporting chain sling, and flexible lever actuating means connected to the upper lever ends and extending downwardly and inwardly therefrom from swinging the upper ends of the levers toward one another when a downward pull is exerted on said actuating means for swinging the inturned lower ends of the levers outwardly and upwardly around the notched upturned bar ends for disengaging the chain links from said notches.

2. A sling tripping device as in claim 1, and guide members secured to said bar between and spaced from said standards and through which portions of said trip lever actuating means extend.

3. A sling tripping device as in claim 2, and guide means supported by said arms and in which upper portions of said trip levers are swingably disposed, said guide means having end portions providing abutments for limiting swinging movement of the trip levers in one direction under the biasing action of said spring means and in the opposite direction in response to a pull on said lever actuating means.

4. A sling tripping device as in claim 1, a hook supporting loop fixed to and depending from the intermediate portion of said bar, and a hook attached to and suspended by said loop and adapted to selectively engage a link of the chain.

5. A sling supporting and tripping device comprising an elongated frame having an upper intermediate portion adapted to be connected to and suspended from above by a hoist means, an elongated bar disposed beneath and secured to said frame and having upturned end portions disposed beyond ends of the frame and provided with outwardly opening inwardly tapered notches adapted to receive and anchor links of end portions of a bundle supporting chain sling, a pair of trip levers, means rising from said bar and supported thereby adjacent to but spaced from the upturned bar ends for pivotally supporting said trip levers at points spaced from the ends of the trip levers, said trip levers having inturned lower end portions underlying said bar and disposed relative to the pivot points of the trip levers to swing in arcs around said upturned bar ends and in adjacency thereto, and flexible lever actuating means connected to upper ends of said levers and extending downwardly and inwardly therefrom and adapted to be manually actuated by a downward pull thereon for swinging the upper ends of the levers inwardly and toward one another to cause the inturned lower lever ends to swing outwardly and upwardly around said upturned bar ends for disengaging the chain ends from said notches.

References Cited in the file of this patent

UNITED STATES PATENTS

| 1,963,634 | Stahl et al. | June 19, 1934 |
| 2,720,988 | McColl | Oct. 18, 1955 |

FOREIGN PATENTS

| 653,848 | Great Britain | May 30, 1951 |